US008661523B2

(12) United States Patent
Barron et al.

(10) Patent No.: US 8,661,523 B2
(45) Date of Patent: Feb. 25, 2014

(54) MASS STORAGE LOCKOUT FOR USB DEVICES ON EXTENDED USB SYSTEM

(75) Inventors: Michael Barron, Austin, TX (US); Raymond A. Dupont, Austin, TX (US); Rajesh K. Mellacheruvu, Austin, TX (US); Randy Printz, Kingsland, TX (US); Syed Mohammad Amir Husain, Round Rock, TX (US)

(73) Assignee: ClearCube Technology, Inc., Austin, TX (US)

( * ) Notice: Subject to any disclaimer, the term of this patent is extended or adjusted under 35 U.S.C. 154(b) by 306 days.

(21) Appl. No.: 12/876,012

(22) Filed: Sep. 3, 2010

(65) Prior Publication Data
US 2011/0119418 A1 May 19, 2011

Related U.S. Application Data

(60) Provisional application No. 61/253,841, filed on Oct. 21, 2009.

(51) Int. Cl.
*H04L 29/06* (2006.01)

(52) U.S. Cl.
USPC ............ 726/14; 726/1; 726/2; 726/3; 726/15; 713/151; 713/152; 713/182; 713/300; 713/310; 709/208; 709/210; 709/225; 709/232

(58) Field of Classification Search
USPC ................ 726/1–25; 713/182–188, 150–152, 713/300–340; 709/208–211, 223–232
See application file for complete search history.

(56) References Cited

U.S. PATENT DOCUMENTS

| 4,962,449 | A | * | 10/1990 | Schlesinger | .................... | 726/21 |
| 2002/0195275 | A1 | * | 12/2002 | Brand et al. | .................... | 175/24 |
| 2007/0282895 | A1 | * | 12/2007 | Sakamaki et al. | ........ | 707/103 R |
| 2008/0134335 | A1 | * | 6/2008 | Kameda | .......................... | 726/24 |
| 2010/0077448 | A1 | * | 3/2010 | Contino et al. | ................... | 726/3 |
| 2011/0271191 | A1 | * | 11/2011 | King | .............................. | 715/719 |

OTHER PUBLICATIONS

Protecting organisations from personal data breaches by Clifton Phua; Publisher: Elsevier; Date: Jan. 2009.*

* cited by examiner

*Primary Examiner* — Madhuri Herzog

(57) ABSTRACT

A method and system, used with an extended USB computer system, for locking out USB mass storage devices at the desktop. For lockout activation, a switch at each host computer is set, and causes a host-side lockout process to deliver a downstream lockout signal to the host's associated portal. This signal causes a portal-side lockout process to disallow USB data from a mass storage device from entering the network.

15 Claims, 4 Drawing Sheets

MASS STORAGE LOCKOUT FOR USB DEVICES ON EXTENDED USB SYSTEM

RELATED APPLICATION DATA

This application claims the benefit of the filing date of U.S. provisional patent application No. 61/253,841, incorporated herein by reference, which was filed on Oct. 21, 2009, by the same inventors of this application.

TECHNICAL FIELD OF THE INVENTION

This invention relates to computer systems equipped with a universal serial bus (USB), and in particular to computer systems in which a host computer is extended to remote USB devices via a USB extension port.

BACKGROUND OF THE INVENTION

USB flash drive technology has greatly changed the ability of a user to transport data from one system to another. A USB flash drive, also commonly referred to as a "disk on key" or "key drive" device, consists of a flash memory mass data storage device integrated with a USB (Universal Serial Bus) interface. USB flash drives are typically removable and rewritable, much smaller than a floppy disk, and weigh less than an ounce.

USB ports, used for connecting flash drives, appear on almost every current mainstream PC and laptop. The USB mass storage standard is supported by modern operating systems such as Windows, Mac OS X, Unix-like systems.

Because of their ease of use and their ubiquity, flash drives present a significant security challenge. They enable unscrupulous persons to smuggle confidential data with little chance of detection. Also, computers are vulnerable to attackers who connect a flash drive to a USB port and introduce malicious software into the computer system. USB flash drives may also be used unwittingly to transfer malware, which can wreak havoc upon an otherwise secure network.

As a result, some organizations have forbidden the use of flash drives. Some companies have configured their computers to disable the insertion of flash drives; others use administration software to control flash drive use. For example, a security solution could be to disconnect USB ports inside the computer or to fill the USB sockets with epoxy.

The above-described security problems can also result from the use of other mass storage devices, such as disk drives and CD-ROM drives. In general, the increasing ease of use and "plug and play" features of today's mass storage device also makes their misuse easier.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The invention described herein is directed to providing a solution to the security problems presented by USB mass storage devices at the desktop of an "extended USB system". As explained below, a system and method are described, in which the "extended USB system" has mass storage lockout features.

An "extended USB system" is one in which multiple PC (personal computer) users are accommodated by centralizing the locations of their PCs, such as by installing multiple PCs into a central frame or cabinet. Each PC's human interface (e.g., keyboard, monitor, mouse, etc.) is located at a respective remote desktop, which may be more than the "normal" USB distance of 10 or 20 feet from the PC computer.

More specifically, in a typical configuration, PC-type host computers are located at a centralized location. The users' desktops are equipped with the usual desktop computer end user devices, such as a mouse, keyboard, monitor, and USB peripherals. A client portal at the desktop connects the user's desktop devices to the host computer across a wired or wireless network. In some extended USB systems, users can also access their host computers through a variety of industry standard access devices (e.g., thin clients, tablets, and PDAs) via a web browser.

Figure 1:
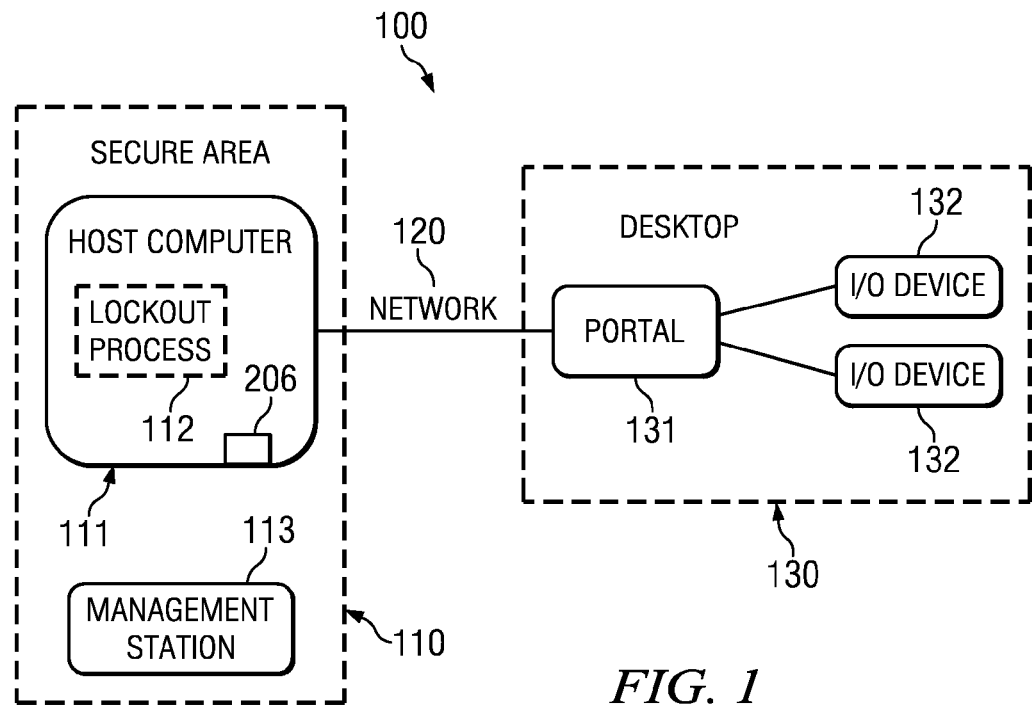
FIG. 1 illustrates an extended USB system having mass storage lockout in accordance with one embodiment of the invention.

FIG. 1 illustrates one host and one client of a portion of an "extended USB system" 100, configured with mass storage lockout in accordance with the invention. A secure location 110 containing the host computers 111 is remotely connected via an IP network 120 to a desktop 130. The desktop 130 has a portal 131 and one or more I/O devices 132. It is assumed that at least one of the I/O devices 132 is a USB mass storage device.

In FIG. 1, only one host computer PC 111 and one desktop 130 are shown; a typical extended USB system has many host computers 111, and many desktops 130, each having an associated port 131 and I/O devices 132. Typically, there is a one-to-one relationship between each host computer 111 and its remote desktop 130.

The host computer 111 may be a "computer on a card". In other words, the host computer 111 may comprise a circuit card having standard computing system components such as a CPU, memory, power supply, and network interface hardware, as well as extension hardware for communicating with the remote portal 131. Host computers of this type are commonly referred to as "blades" and may be may be easily housed in a chassis, rack-mounted, and centralized in a secure location.

In FIG. 1, host computer 111 is also equipped with a lockout process 112 and a lockout switch, which, together with a lockout process of portal 131, implement mass storage lockout in the manner described below. Further details of the lockout features of host computer 111 and portal 131 are described below.

As stated above, the network 120 between the blade location 110 and the portals may be wired or wireless. Ethernet protocols may be used for local networks. For long distance networks, at least one protocol has been developed for communicating desktop (USB and/or display) data to and from the desktop devices over a standard IP network. These "extended desktop IP protocols", like voice-over-IP, can deliver two-way audio data, but they also deliver USB and display data, using graphics compression specifically designed to communicate the desktop data over IP networks. An example of such a protocol is the "PCoIP®" (PC-over-IP®), a product of the Teredici Corporation.

IT administrators remotely control the entire system by using management software installed at a management station 113. In the example of FIG. 1, station 113 is co-located at the secure location 110 (on-site), but station 113 could also be remote. Typical functions of the management software include connection brokering, virtual machine integration, BIOS upgrades, health monitoring, security configuration, and customized views and reporting.

Additional details describing system 100, but not having mass storage lockout features, may be found in the following patents, each of which are incorporated herein by reference: U.S. Pat. No. 6,708,247, entitled "Extending Universal Serial Bus to Allow Communications with USB Devices at a Remote Location"; U.S. Pat. No. 6,886,055, entitled "Computer on a Card with Remote Human Interface; and U.S. Pat. No. 6,735,658, entitled "System and Method for Combining Computer Video and Remote Universal Serial Bus in an Extended Cable".

Figure 2:
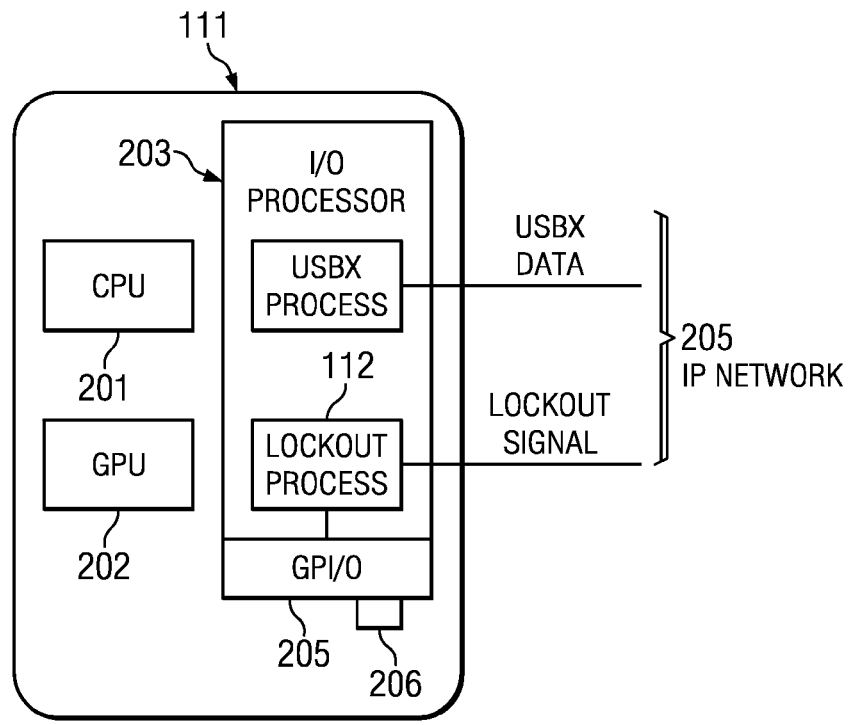
FIG. 2 further illustrates the host side of the mass storage lockout, according to one embodiment.

FIG. 2 illustrates host computer 111 in further detail. In the example of this description, host computer 111 is an Intel-based PC device having a blade-type form factor. As stated above, the chassis containing a blade PC 111 may comprise various disk drive, memory, graphics card devices, and network connection devices.

In FIG. 2, blade PC 111 is illustrated as having at least a CPU (central processing unit) 201 and GPU (graphics processing unit) 202. In the example of FIG. 2, network 205 is an IP (Internet Protocol) network. An I/O processor 203 converts the desktop environment data into IP packets that are sent to the portal device. Network communications are via an IP network following an IP protocol that provides for USB desktop extension, as described above.

For USB data, I/O processor 203 controls and monitors all data that is sent or received from its associated portal 131. It has appropriate programming for providing a USB interface to the rest of host computer 111, as well as a "USB extension process" for sending and receiving USB data in a manner that allows it to be communicated in packets over an IP network. The USB data encoded and decoded by processor 203 is referred to herein as "USBX" data.

I/O processor 203 includes a GPIO (General Purpose Input and Output) component 205, which senses certain functions controlled by processor firmware. By using a jumper switch 206 on the GPIO pin of processor 203, a "lockout process" 112 is activated. It should be understood that although the example of this embodiment uses a jumper switch, any other type of hardware or software switch could be used. In general, a hardware switch may be preferred if considered more secure.

More specifically, I/O processor 203 is programmed with a host-side USB mass storage lockout process 112. This process 112 is typically implemented with firmware to inhibit tampering, but could be implemented as software. Referring to both FIGS. 1 and 2, when switch 206 is set in the mass storage lockout position, the lockout process 112 is activated. The lockout process 112 will then send a signal to the portal 331 via the IP network. This is an "out of band" signal relative to the USB data, but is encapsulated in IP network packets. As explained below, receipt of the lockout signal by portal 131 causes portal 331 to lock out any USB device of the class "mass storage device". An advantage of portal-side lockout is that the prohibited USB data does not affect the network bandwidth.

Jumper 206 may be set only by a person who has access to the secured environment. This hardware jumper is safe against the usual software threats. By enabling the jumper on the blade, the lockout process causes all USB traffic to be monitored.

Figure 3:
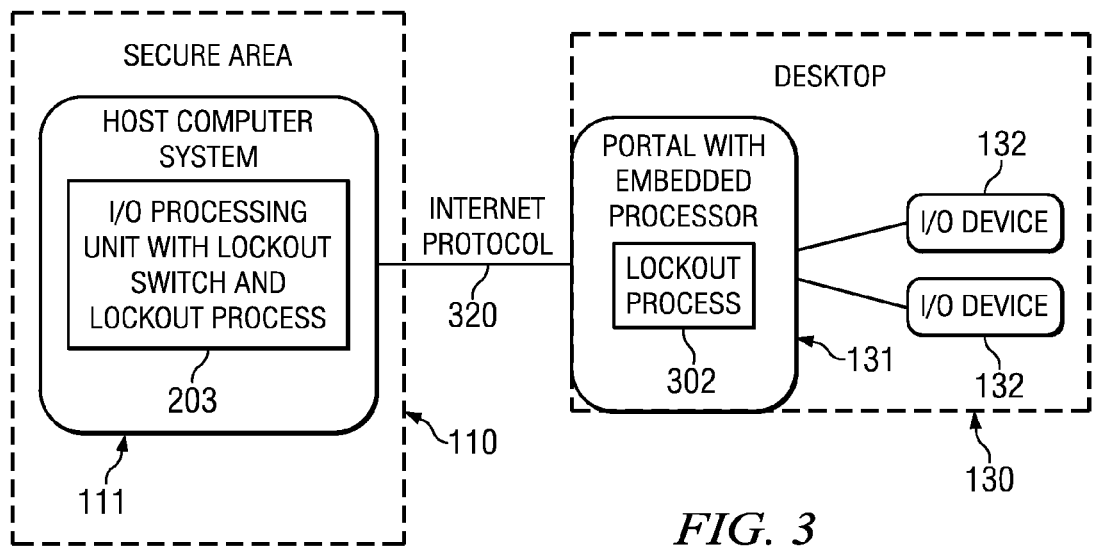
FIG. 3 further illustrates the portal side of the mass storage lockout, according to one embodiment.

FIG. 3 provides further details of the portal side of the lockout process. As explained below, prohibited USB mass storage data never leaves the portal 131.

Portal 131 provides the function of a USB controller, with added logic and/or programming for extending the USB bus for extended PCoIP communications with host computer 110. In general, portal 131 translates incoming USBX packets to USB data and vice versa. The USB function on the portal 131 is local to that device until a session is formed with the I/O processor 203. It is assumed that portal 131 has appropriate processing, memory, and I/O hardware and programming for performing these tasks.

Portal 131 is further programmed with a portal-side lockout process 302. Typically, this lockout processes 302 is implemented with firmware, but may also be implemented with software.

The lockout process 302 exploits the fact that USB data contains data that identifies USB devices by class. More specifically, a feature of the USB standard is that USB data from a USB device includes an identification of the device class. Class codes identify a device's functionality and permit the operating system to attach a device driver based on that functionality. USB mass storage devices, which may include any mass storage devices such as key drives, floppy drives, CD-ROM drives, and the like, may be identified by their class.

Figure 4:
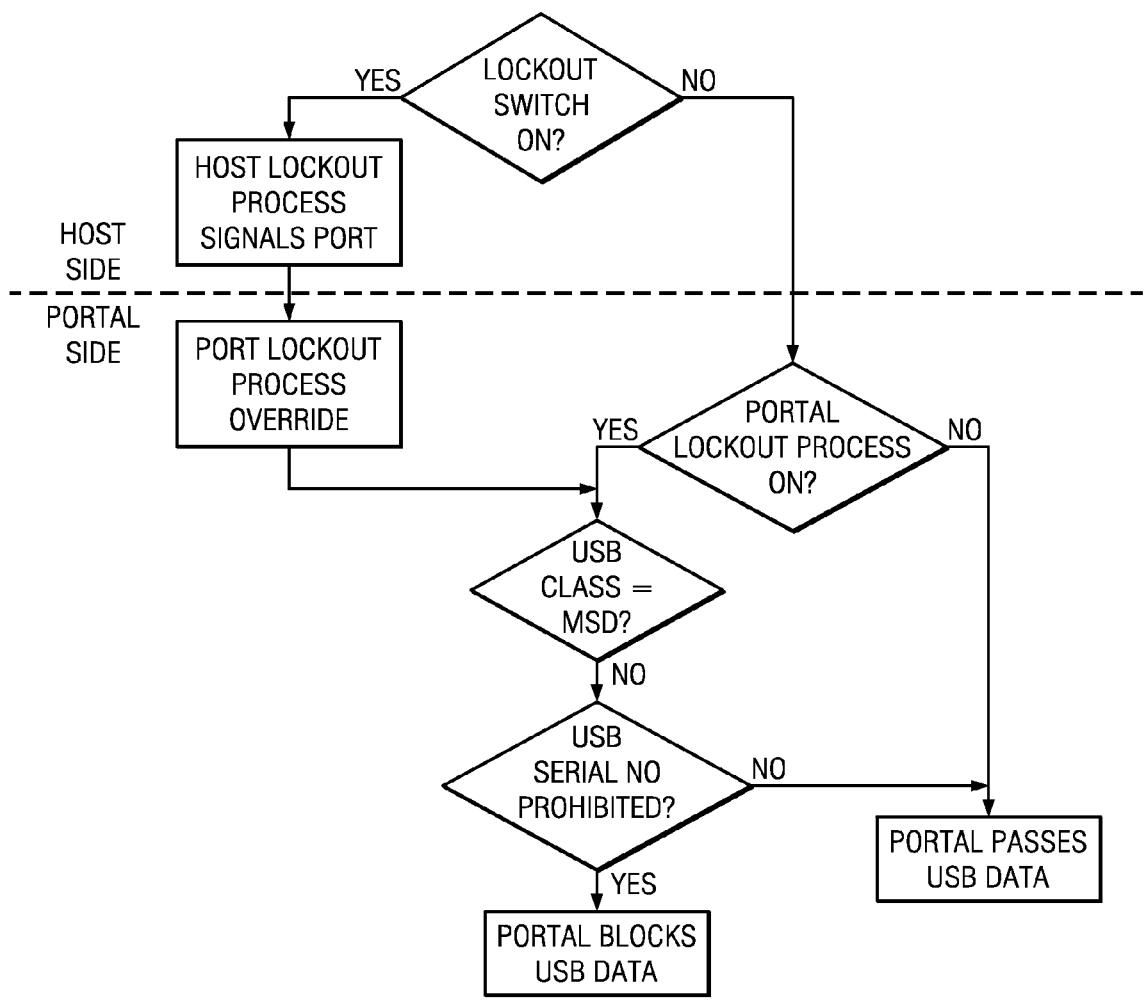
FIG. 4 illustrates a method of locking out USB mass storage devices using an extended USB system such as that of FIG. 1, according to one embodiment.

Referring to both FIGS. 3 and 4, if the lockout process 302 is enabled (either by being locally activated or by a signal from the host), the lockout process 302 examines the class identification portion of the USB data incoming from I/O devices 132. It compares the class identification data with stored identification data, and determines when incoming USB data is associated with a mass storage device. Whenever it identifies a USB mass storage device plugged into a USB port on the port (or indirectly connected through a USB hub) downstream of the portal 131, it will prevent the data from entering the IP network.

The portal-side lockout process may be further programmed to lockout (or allow) only specified registered serial numbers or other type of "specific identifier". Thus, it is possible to allow or disallow only specified USB devices.

The portal-side lockout process 302 also has an override feature. If portal 331 establishes a session with a host computer that has its lockout switch 206 enabled, the portal lockout process 302 will automatically lock out all mass storage devices, overriding any local programming of lockout process 302. Because switch 206 is in a secure area and is set manually by hardware, even if a portal 131 is tampered with, unauthorized USB mass storage data can still be locked out of the network.

Figure 5:
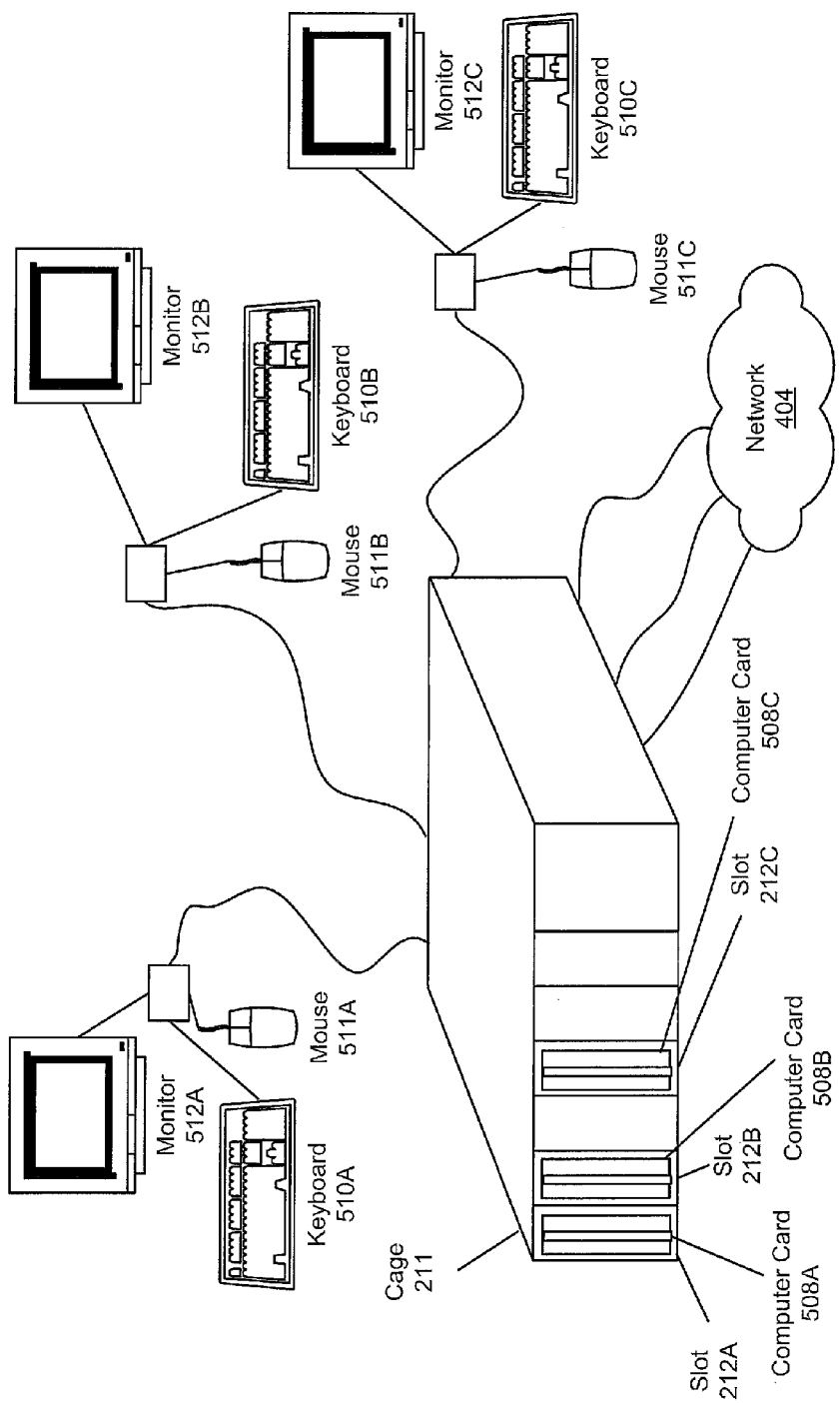
FIG. 5 illustrates a computing system comprising a plurality of computer cards coupled to a plurality of corresponding user interfaces, according to one embodiment.

FIG. 5: Multiple Computer Systems With Remote Human Interfaces

FIG. 5 illustrates an exemplary embodiment of the computing system in which multiple computer cards 508 are inserted into the slots of the cage 211. As FIG. 5 shows, each computer card 508 may be coupled to a plurality of human interface devices through the cage connector and cables. As shown, computer card 508A may be inserted into cage slot 212A, and may thereby be coupled to keyboard 510A, mouse, 511A, and monitor 512A, which comprise the human interface 513A for that computer card. Computer cards 508B and 508C may be similarly inserted into respective slots 212B and 212C and coupled to respective human interface devices 513B and 513C as shown. Thus, the computer cards 508 may all be installed in the cage 211 at a central location, while the user interface 513 for each computer card 508 may be located remotely from the cage, such as at the respective work areas of the users of the computer cards. It should be noted that the human interface devices shown here are for illustration purposes only, and that the actual type and number of devices comprised in each human interface may vary.

FIG. 5 also shows that each computer card 508 may be coupled to a network 404. Each computer card may include network logic for interfacing to the network 404. The network 404 may be one or more of a Local Area Network (LAN) or a Wide Area Network (WAN), such as the Internet.

Figure 6:
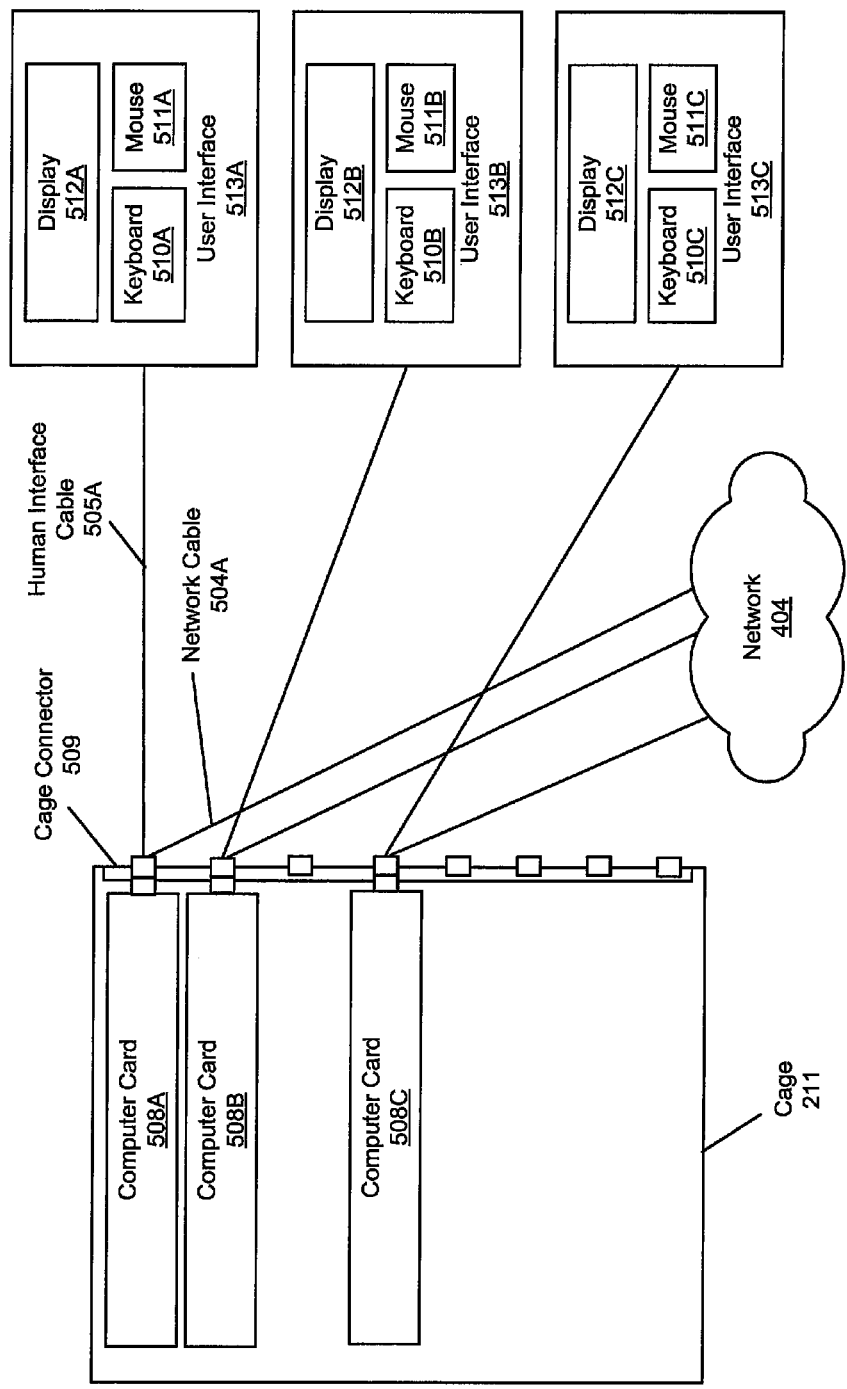
FIG. 6 is a block diagram of the computing system of FIG. 5, according to one embodiment.

FIG. 6: A Block Diagram Of Multiple Computer Systems With Remote Human Interfaces FIG. 6 is a block diagram of the system described above with reference to FIG. 5. As FIG. 6 shows, the cage 211 may include cage connector 212 which is operable to couple to one or more human interface cables 505 for coupling to human interface devices and to one or more network cables 504 (e.g., 504A) for coupling to one or more networks, respectively. In one embodiment, the computer cards 508 may be inserted into respective slots 212 of the cage 211, and coupled to respective user interfaces 513 through cage connector 509 and one or more human interface cables 505, such as cable 505A. Each user interface 513 may include one or more human interface devices, such as keyboard 510, mouse, 511, and monitor 512, or any other human interface device. As FIG. 6 also shows, each computer card 508 may also be coupled to network 404 through the cage connector 509 and the one or more network cables 504, such as 504A. In one embodiment, the network cable 504 may comprise an Ethernet cable. Thus, multiple computer cards 508 may be installed in a centrally located computer cage 211, and coupled to remote human interfaces 513 and network 404.

The system described above solves many of the problems of the prior art. By centralizing the location of the computing elements while permitting the remote location of the human interfaces to the computers, the management of both the hardware and software may be greatly simplified. As the hardware and software for all units are in one place, an administrator may install, deploy, and troubleshoot hardware units and software more easily, which improves the scalability of the system and decreases support costs. The central location of the computing hardware and software also allows the administrator to manage access to both the hardware and software more easily, which greatly increases the security of the system. Additionally, the central location of all computing hardware simplifies the physical topology of the network. The central location of the computing hardware also may increase the reliability of the system by allowing greater thermal management of the system, i.e., because the units are all kept in one location, the temperature may be regulated for optimum conditions. The removal of the computing hardware from the user's workspace improves the physical environment of the user by either freeing up desktop space or floor space.

What is claimed is:

1. A computer-implemented method of locking out data from a USB mass storage device in an extended USB system, the method comprising:

providing an extended USB system, wherein the extended USB system comprises a host computer, comprising:
a central processing unit (CPU) and memory;
a graphics processing unit (GPU) coupled to the CPU; and
an I/O processor coupled to the CPU and the GPU;
a portal device, coupled to the host computer via an IP network, wherein the portal device is a USB controller with added HI logic, and wherein the portal device is remote from the host computer; and
a remote human interface (HI) comprising one or more USB HI devices, an HI display device, and one or more USB mass storage devices, wherein the remote HI is coupled to the host computer via the portal device, wherein the one or more USB devices are located remotely from the host computer, wherein the remote HI does not comprise a general purpose computer for executing software applications, and wherein the extended USB system is restricted to a one-to-one relationship between the host computer, the portal device, and the remote HI;

wherein the HI logic of the portal device is configured to implement:

translating incoming USB eXtension protocol (USBX) IP packets from the I/O processor of the host computer to USB data for provision to the one or more USB HI devices or the one or more USB mass storage devices; and translating USB data from the one or more USB HI devices or the one or more USB mass storage devices to USBX IP packets for provision to the I/O processor of the host computer;

providing a hardware lockout switch at the host computer of the extended USB system, the hardware lockout switch operable between an activated or inactivated position, wherein the hardware lockout switch is a jumper switch;

providing a host lockout process at the host computer, the host lockout process programmed to deliver a lockout signal to the portal device, via the IP network, in response to the hardware lockout switch being in the activated position; and providing a portal lockout process at the portal device, the portal lockout process programmed to receive the lockout signal, and, in response to the signal, to block all data from the one or more USB mass storage devices at the remote HI from entering the IP network.

2. The method of claim 1, wherein the USB eXtension protocol provides for delivery of two-way audio data and USB data, and further provides for delivery of display data using graphics compression specifically designed to communicate desktop data over IP networks.

3. The method of claim 1, wherein the lockout signal is communicated in packets separate from packets containing USB message data.

4. The method of claim 1, wherein the portal lockout process is further programmed to read the USB data to determine a class identifier of an originating USB device and to compare the class identifier to one or more stored class identifiers.

5. The method of claim 1, wherein the portal lockout process is configured for activation in the absence of a lockout signal, but overridden upon receipt of the lockout signal.

6. The method of claim 1, wherein the portal lockout process is further programmed to read a mass storage device specific identifier and to lock out the mass storage device based on the specific identifier.

7. The method of claim 6, wherein the specific identifier is a serial number.

8. An extended USB system, providing for locking out data from a USB mass storage device, the extended USB system comprising:
  host computer, comprising:
   a central processing unit (CPU) and memory;
   a graphics processing unit (GPU) coupled to the CPU; and
   an I/O processor coupled to the CPU and the GPU;
  a portal device coupled connected to the host computer via an IP network, wherein the portal device is a USB controller with added HI logic, and wherein the portal device is remote from the host computer; and
  a remote human interface (HI) comprising one or more USB devices, an HI display device, and one or more USB mass storage devices, wherein the remote HI is coupled to the host computer via the portal device, wherein the one or more USB devices are located remotely from the host computer, wherein the remote HI does not comprise a general purpose computer for executing software applications, and wherein the extended USB system is restricted to a one-to-one relationship between the host computer, the portal device, and the remote HI;
  wherein the HI logic of the portal device is configured to implement:
  translating incoming USB eXtension protocol (USBX) IP packets from the I/O processor of the host computer to USB data for provision to the one or more USB HI devices or the one or more USB mass storage devices;
  translating USB data from the one or more USB HI devices or the one or more USB mass storage devices to USBX IP packets for provision to the I/O processor of the host computer;
  a hardware lockout switch at the host computer of the extended USB system, the hardware lockout switch operable between an activated or inactivated position, wherein the hardware lockout switch is a jumper switch;
  a host lockout process at the host computer, the host lockout process programmed to deliver a lockout signal to the portal device, via the IP network, in response to the lockout switch in the activated position; and
  a portal lockout process at the portal device, the portal lockout process programmed to receive the lockout signal, and, in response to the signal, to block all data from the one or more USB mass storage devices at the remote HI from entering the IP network.

9. The extended USB system of claim 8, wherein the USB eXtension protocol provides for delivery of two-way audio data and USB data, and further provides for delivery of display data using graphics compression specifically designed to communicate desktop data over IP networks.

10. The extended USB system of claim 9, wherein the lockout signal is communicated in packets separate from packets containing USB message data.

11. The extended USB system of claim 8, wherein the portal lockout process is further programmed to read the USB data to determine a class identifier of an originating USB device and to compare the class identifier to one or more stored class identifiers.

12. The extended USB system of claim 8, wherein the lockout switch is a jumper switch.

13. The extended USB system of claim 8, wherein the portal lockout process is configured for activation in the absence of a lockout signal, but overridden upon receipt of the lockout signal.

14. The system of claim 8, wherein the portal lockout process is further programmed to read a mass storage device specific identifier and to lock out the mass storage device based on the specific identifier.

15. The extended USB system of claim 14, wherein the specific identifier is a serial number.

* * * * *